Patented Aug. 4, 1931

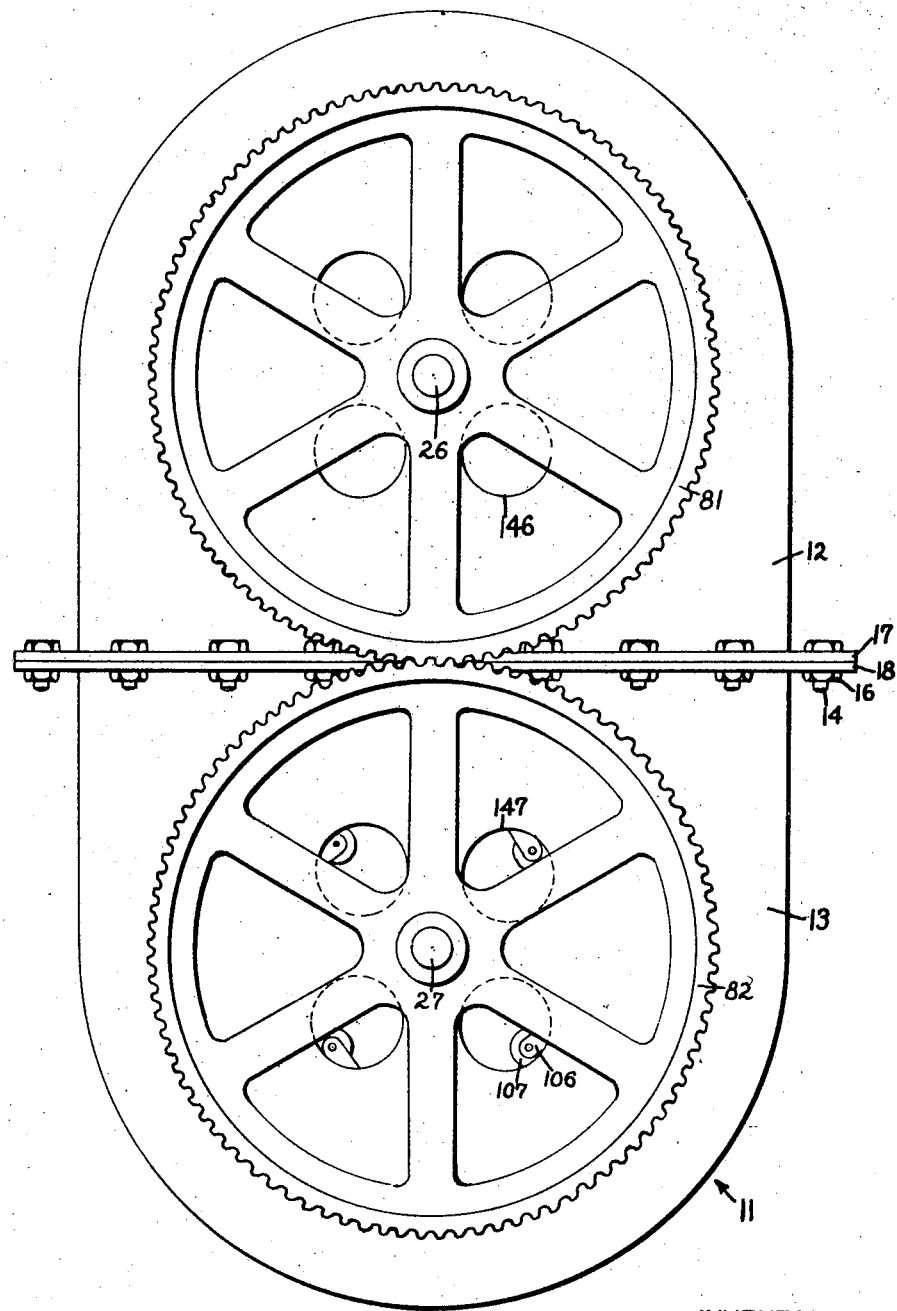

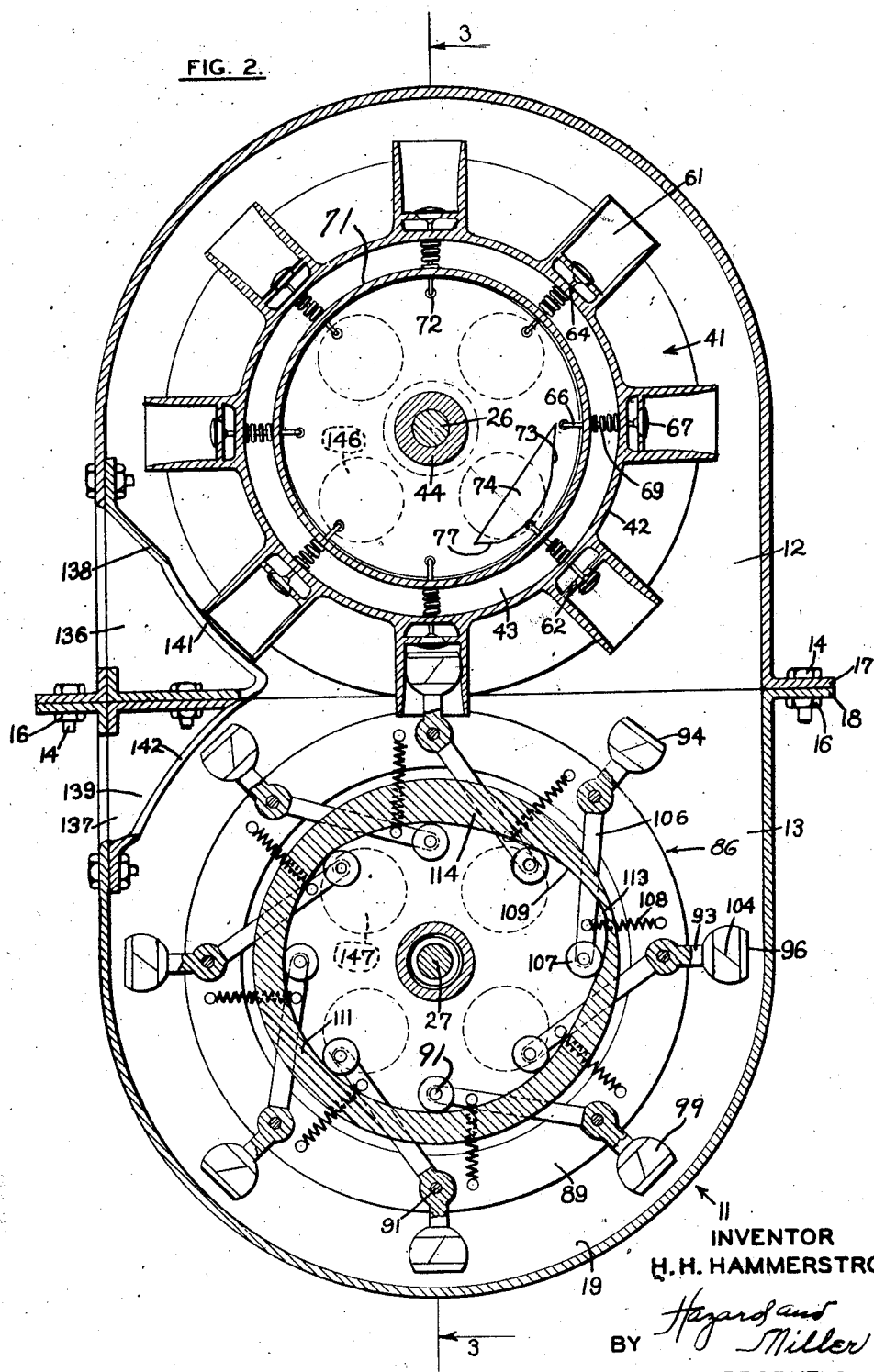

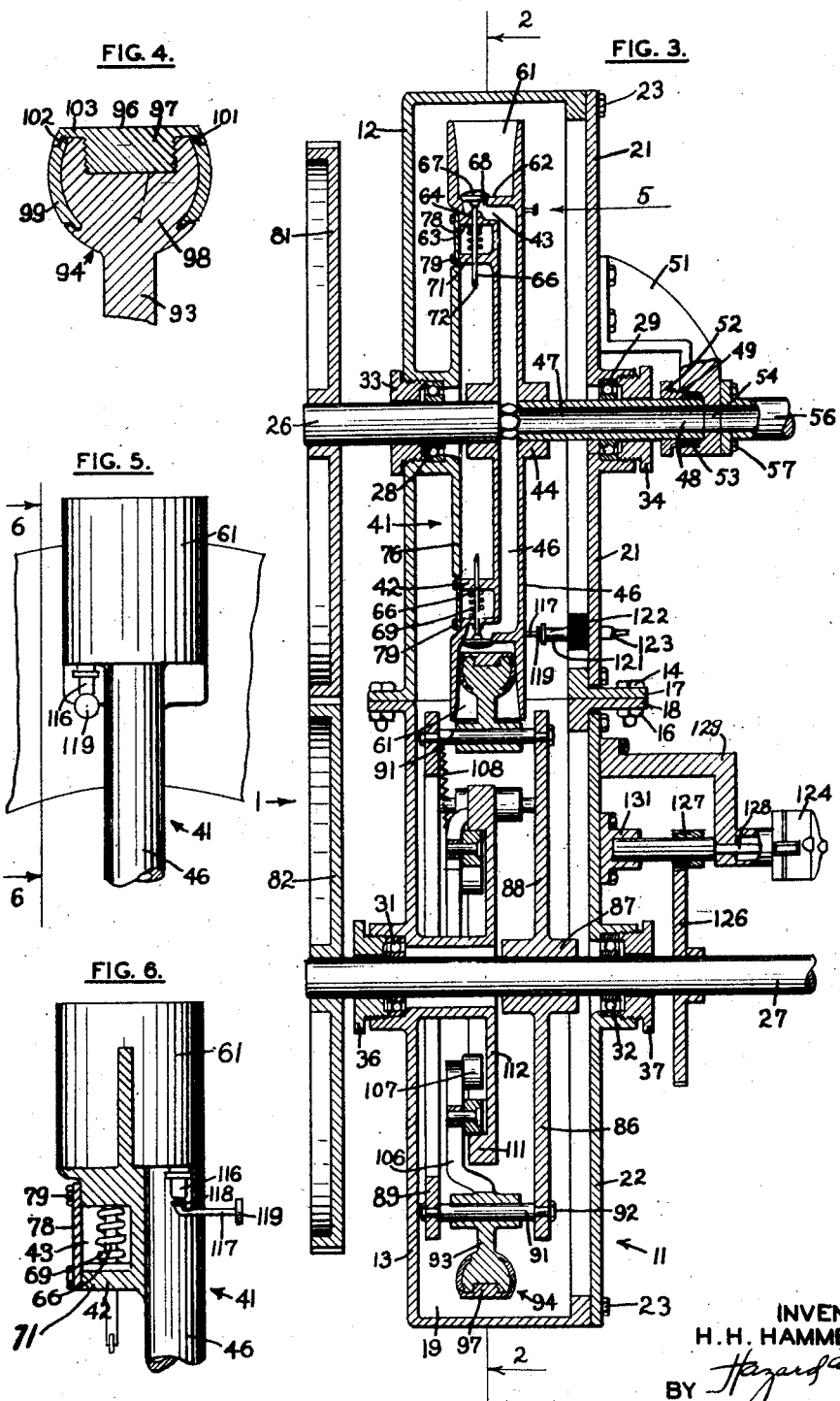

1,817,370

UNITED STATES PATENT OFFICE

HENRY H. HAMMERSTROM, OF LOS ANGELES, CALIFORNIA, ASSIGNOR OF ONE-HALF TO HARRY M. MIDDAGH, OF LOS ANGELES, CALIFORNIA

ROTARY MOTOR

Application filed November 7, 1928. Serial No. 317,832.

This invention relates to rotary motors, and has for an object, the provision of a novel type of motor having a plurality of cylinders carried by one rotor, and a plurality of pistons carried by another rotor, the pistons being receivable within, and removable from said cylinders as the rotors turn.

Many advantages have been gained from this type of motor construction, among which might be mentioned the enhanced ease and thoroughness of scavenging the cylinders at the conclusion of each power stroke, and also the application of the power derived from the power stroke to one of the rotors adjacent the periphery thereof and more nearly tangentially of that rotor than in the case where the power is applied to a crankshaft by means of the conventional crank throws and connecting rod. This last mentioned advantage results from the fact that the cylinder from which the power is being derived, is itself, moving in a direction which tends to place its axis tangent to the piston rotor in contradistinction to the crankshaft type of engine wherein the force exerted upon the piston is always in the direction of a diameter of the path described by the crank pin. It is obvious, therefore, that more of the power derived from the power stroke will be delivered to the piston rotor to effect rotation thereof, and that less of this power will be expended in stresses in the frame of the engine itself.

Another object is the provision of a rotary motor of the general character described, wherein the piston rotor is provided with means for advancing and retarding the pistons in respect thereto, to compensate for the irregular rate of travel of the area of contact of each piston with its associated cylinder throughout their period of engagement.

A further object is the provision of a rotary motor having a plurality of cylinders carried by a rotor, and in which the fuel is supplied to the cylinders through an intake manifold which is provided in the hollow rim and at least one hollow spoke of the cylinder rotor.

A still further object is the provision of a rotary motor having an intake manifold as described, and in which each of the cylinders is provided with an intake valve having a valve stem adapted to be engaged by a cam as the rotor turns, so as to unseat the valve and permit charging the associated cylinder with fuel. It may be readily understood that this provides an unusually simple and efficient type of valve actuating mechanism.

A still further object is the provision of a rotary motor as described, each of the pistons of which is spherical, thus facilitating entrance of the pistons within their associated cylinders.

A still further object is the provision upon each of these spherical pistons, of a piston ring which is in the form of a frustum of a sphere, and each of which rings presses outwards to maintain a tight seal with the walls of its cylinder throughout their period of engagement, regardless of the angularity between the axes of the cylinder and its piston.

Another object is the provision of a rotary motor as described, in which each cylinder is provided with an individual spark plug for the proper ignition of the fuel, but in which the means for energizing all the spark plugs successively, is a single contact point adapted to engage the spark plugs as they move therepast, thus simplifying the wiring and still providing an efficiently operating ignition system.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a rear elevation of an engine incorporating the principles of my invention.

Fig. 2 is a vertical, transverse sectional view, the plane of section being indicated by the line 2—2 of Fig. 3, and the direction of view by the arrows.

Fig. 3 is a vertical, longitudinal sectional view, the plane of section being indicated by the line 3—3 of Fig. 2, and the direction of view by the arrows.

Fig. 4 is an enlarged detail view in vertical section, of one of the pistons.

Fig. 5 is an enlarged detail view of one of the cylinders, the direction of this view being indicated by the arrow 5 of Fig. 3.

Fig. 6 is an enlarged, vertical sectional view showing the cylinder of Fig. 5 in side elevation. The plane of section is indicated by the line 6—6 of Fig. 5, and the direction of view by the arrows.

Specifically describing the invention in its most practical form of which I am at present aware, I have provided a housing indicated in its entirety at 11 and preferably being built up of a pair of sections 12 and 13 rigidly attached together by means of bolts 14 having nuts 16 threaded thereon to clamp together flanges 17 and 18 which are provided upon the housing sections 12 and 13 respectively. Thus is provided an enclosed chamber 19 within which the operative parts of the motor are confined. Removable front portions 21 and 22 are provided for the upper and lower sections 12 and 13 respectively, these front portions 21 and 22 being removably held in place by cap screws 23 or their equivalent.

A pair of shafts 26 and 27 are journalled in the housing 11, to extend across the chamber 19, the shaft 26 being journalled in anti-friction bearings 28 and 29 in the back wall of the upper housing portion 12 and the removable front wall 21 respectively, and the shaft 27 being journalled in anti-friction bearings 31 and 32 carried by the back of the lower housing portion 13 and the removable front wall 22 respectively. These anti-friction bearings 28, 29, 31, and 32, are removably held in place by threaded glands 33, 34, 36, and 37 respectively.

A cylinder rotor 41 is affixed to the upper shaft 26. This cylinder rotor 41 comprises a rim 42, which is hollow, having an annular chamber 43 extending throughout the length thereof. This hollow rim 42 is rigid with the hub 44, being connected thereto by a plurality of spokes 46, at least one of which is hollow. Preferably however, all the spokes 46 are hollow, with their bores in communication with the annular chamber 43. These bores are also in communication with a bore 47 formed in one end 48 of the shaft 26. This end 48 is received within a stuffing-box 49, carried by a bracket 51 which is rigid with the front wall 21. A gland nut 52, threaded into the bracket 51, is adapted to press packing 53 tightly around the end 48 of the shaft 26; and a hole 54 extending through the bracket 51, is adapted to establish communication between the bore 47 of the shaft 26 and a fuel manifold pipe 56, which is adapted to carry fuel vapor from any desired type of carburetor. This manifold pipe 56 is rigidly attached to the bracket 51, in register with the hole 54, by means of cap screws 57 or their equivalent.

A plurality of cylinders 61, are disposed upon the rim 42 extending radially outwards therefrom. The outer ends of these cylinders 61, are open, as clearly shown upon Fig. 3, whereas the inner ends are closed by an integral partition 62, which serves to separate the annular chamber 43 or intake manifold from all of the cylinders 61. Observation of Fig. 3 will reveal that the spokes 46 are disposed at one side of the chamber 43, leaving an inner annular partition 63 of sufficient extent to provide a valve guide 64 within which the stem 66 of a valve 67, is slidably disposed. One of these valves is associated with each cylinder 61, and all of the valves 67 are disposed with their stems 66 extending radially inwards from the inner end of the associated cylinder, and with the valve proper, normally closing a port 68 in the partition 62. Each of these ports 68 establishes communication between the annular intake manifold 43 and one of the cylinders 61, when the associated valve 67 has been lifted from its seat. A coil spring 69 is under compression between the annular partition 63 and another annular partition 71 carried by the spokes 46. The stem 66 of each valve 67, extends through this latter partition 71 also, so that a roller 72, journalled upon the inner end of each valve stem 66, may at one point in the rotation of the rotor 41, engage the inclined surface 73 of a cam 74. This cam 74 is supported upon a shield 76 rigid with the after wall of the upper housing section 12, which also serves to exclude dust from the otherwise exposed portions of the valve stems and rollers. The after end 77 of the cam 74 is also inclined, though not as gently as the leading edge 73, the purpose being to permit the relatively gentle seating of the valves 67 as the rollers 72 pass from the cam 74. It is believed apparent from the above described construction, that as the rotor 46 turns, each of the rollers 72, comes against the cam 74, and that as the roller passes over the inclined surface 73, the valve 67 is raised from its seat against the action of the spring 69, opening the port 68, permitting influx of fuel to the associated cylinder 61. This flow of fuel from the manifold 43 into the cylinders 61, is increased, if not entirely effected by the centrifugal force developed as a result of the rotational movement of the rotor 42. Access to the springs 69 may be had by removing an annular cover plate 78, secured to both partitions 63 and 71, by cap screws 79 or their equivalent.

A gear wheel 81 of substantially the same radius as the rotor 42, is rigidly attached to the shaft 26, preferably outside the housing 11. This wheel 81 is enmeshed with a similar gear wheel 82, rigid with the shaft 27, also, preferably, on the exterior of the housing 11, with the result that both shafts 26 and 27 are rotated at the same rate, but in opposite directions.

A second rotor 86 is rigidly attached to the shaft 27 inside the housing 11. This rotor 86 includes a hub 87, provided with a plurality of spokes 88, preferably connected at their outer ends by an integral ring. Another ring 89 of similar dimensions, is retained in spaced relationship therewith by a plurality of stay bolts 91, having nuts 92 upon each end.

A piston rod 93 is mounted for pivotal movement upon each of the stay bolts 91; and a piston 94 is rigid and preferably integral with the outer end of each of the rods 93. The pistons 94 correspond in number to the cylinders 61, and are of such dimensions that each of the pistons 94 is receivable within one of the cylinders 61, and removable therefrom as the two rotors turn. To facilitate entrance of the pistons into their respective cylinders, they are spherical in shape, preferably flattened upon their outer sides as at 96. This flattened face 96 is in reality, the top of a plug 97 which is threaded into the body 98 of each piston 94, to releasably retain in place, a piston ring 99. Each ring 99 is in the form of a frustum of a sphere, as clearly shown upon Fig. 4; and an upstanding bead 101 is provided upon each edge of each ring 99. These beads 101 are receivable within grooves 102 in the adjacent ring lands in the body of the piston, and in the top flange 103 of each of the ring-retaining plugs 97. Preferably the rings 99 are resilient, being split angularly as indicated at 104 upon Fig. 2, so as to enable the rings to press outwards and establish a tight seal with the walls of the cylinder throughout the period that the piston is contained within the cylinder, regardless of what degree of angularity obtains between the axis of the cylinder and that of the piston rod 93; it being understood that the parts are so proportioned that a suitable clearance is established between each ring 99 and its respective ring land, and also between each ring and the flange 103 of the associated plug 97. In this manner the rings 99 are so mounted that they float within their respective grooves which are defined by the ring lands and flanges 103.

An arm 106 is rigid with and extends laterally, or angularly, from each piston rod 93. A roller 107 is journalled upon the inner end of each of the arms 106; and coil springs 108 under tension between the arms 106 and the ring 89, urge the rollers 107 against the face 109 of a continuous cam 111. This cam 111 is supported upon a shield 112 rigid with the after wall of the lower housing section 13, and is provided with an indentation 113 and a raised portion 114, as shown upon Fig. 2.

The indentation 113 is situated so that the roller 107 of a piston 94, is disposed therein at substantially the same time that that piston is entering its cylinder 61. Because of the fact that the arm 106 extends angularly inwards and backwards from the axis of the piston rod 93, the piston will be thus slightly advanced in respect to the rotor 86. The raised portion 114 of the cam 111, is situated so that it is engaged by a roller 107 when its associated piston is just leaving its associated cylinder 61, resulting in a slight retardation of that piston in respect to the rotor. In effect then, the angular velocity of each of the pistons 94, is less than would be the case if the piston rods 93 were rigidly attached to the rotor 86. This provision has been made because of the fact that the radial distance from the center of the rotor 86 to the area of contact of a piston 94 with its cylinder, is substantially constant throughout the period of their engagement, whereas the radial distance from the center of the rotor 42 to this same area of contact, varies throughout the same period. Because of this phenomenon, the rate of travel of this area of contact is not constant throughout the period of engagement; and the length of angularity of the arms 106, as well as the dimensions of the cam 111, have been proportioned to satisfactorily compensate for this irregular rate of travel.

Means for igniting the fuel in each of the cylinders, is provided. A spark plug 116 is threaded through the partition 62 into each cylinder 61, and a conductor 117 leading from the insulated contact 118 of the spark plug, terminates in an enlarged surface 119 at one side of the rotor 86. All of these conductors 117 and enlarged surfaces 119, are so disposed that they are adapted to successively either engage or pass closely adjacent to a stationary contact 121 rigid with the removable front wall 21, and insulated therefrom by suitable insulating material 122. This contact 121 is connected by a conductor 123, to a timing mechanism 124, of any suitable nature. Preferably this timing mechanism is adapted to make and break a primary circuit at just the instant that each of the conductors 117 is passing the stationary contact 121, a suitable induction coil being employed and properly connected to the conductor 123 to produce a high tension current by means of which a spark is formed by the associated spark plug 116 within the cylinder 61. Preferably the stationary contact 121 is so situated that this spark takes place when the cylinder and its associated piston are substantially directly between the two shafts 26 and 27. Any suitable means for operating the timing mechanism 124, may be employed. For example, a gear 126 carried by the shaft 27, enmeshes a driven gear 127 which is rigid with the shaft 128 of the timing mechanism 124. This shaft 128 may be journalled in a bracket 129 and a socket 131 rigid with the removable front wall 22 of the lower housing section 13.

An exhaust manifold is provided in the form of structures 136 and 137, preferably removably attached to the upper and lower housing sections 12 and 13 respectively. Together, these two structures 136 and 137, form a wedge-shaped protrusion upon the inside of the housing 11, and they are so proportioned that the outer ends of the cylinders 61 and the pistons 94, pass closely adjacent the sloping walls 138 and 139, immediately after the pistons have been withdrawn from the cylinders. Apertures 141 and 142 are formed in the sloping walls 138 and 139 respectively, through which exhaust gases may pass to the interior of structures 136 and 137; and any suitable exhaust pipe may be employed to conduct exhaust gases from the manifold. Complete scavenging is effected because of the fact that each of the pistons is completely removed from the associated cylinder, and the centrifugal action will tend to throw the exhaust gases from the cylinder into the exhaust manifold.

A plurality of apertures 146 and 147, are provided in the rear walls of the upper and lower housing sections 12 and 13 respectively, to provide ventilation of the chamber 19, both for the purpose of cooling the mechanism, and for supplying sufficient oxygen to support the proper combustion of the fuel within the cylinders. Any suitable power take-off may be provided upon either one or both of the two shafts 26 and 27.

It is understood that the details of the invention as herein disclosed, are subject to alteration within the spirit or scope of the appended claims.

I claim:

1. In a rotary motor, a housing, a pair of parallel shafts journalled therein, means coupling said shafts together for rotation at the same rate and in opposite directions, a rotor affixed to each shaft, a plurality of cylinders carried by one rotor, a plurality of pistons carried by the other rotor, each being receivable within one of said cylinders as said rotors turn, the walls of each of said pistons being spherical in form, a resilient piston ring associated with each piston and disposed in a complementary groove therein, each of said rings being in the form of a zone of a sphere, means for supplying fuel to said cylinders, and means for igniting the fuel in each of said cylinders.

2. In a rotary motor, a housing, a pair of parallel shafts journalled therein, means coupling said shafts together for rotation at the same rate and in opposite directions, a rotor affixed to each shaft, a plurality of cylinders carried by one rotor, a plurality of pistons carried by the other rotor, each being receivable within one of said cylinders as said rotors turn, the walls of each of said pistons being spherical in form, and each piston having a groove therein, ring lands defining said groove, a resilient piston ring associated with each piston and floating in the groove therein, each of said rings being in the form of a zone of a sphere, upstanding beads on the edges of said rings receivable within grooves in the ring lands of said pistons, means for supplying fuel to said cylinders, and means for igniting the fuel in each of said cylinders.

3. In a rotary motor, a pair of substantially tangentially arranged rotors disposed for rotation in opposite directions, a plurality of cylinders carried by one of said rotors, a plurality of pistons carried by the other rotor, each piston being receivable within one of the cylinders as the rotors turn, means for supplying fuel to said cylinders, means for igniting the fuel in each cylinder when said cylinder and its associated piston are substantially between the axes of rotation of said rotor, means inter-connecting said rotors for relative rotation at a constant rate, and means for advancing and retarding said pistons in respect to their rotor to compensate for the irregular rate of travel of the area of contact of each piston with its associated cylinder throughout the period of their engagement.

4. In a rotary motor, a pair of substantially tangentially arranged rotors disposed for rotation in opposite directions, a plurality of cylinders carried by one of said rotors, a plurality of pistons carried by the other rotor, each piston being receivable within one of the cylinders as the rotors turn, means for supplying fuel to said cylinders, means for igniting the fuel in each cylinder when said cylinder and its associated piston are substantially between the axes of rotation of said rotor, means inter-connecting said rotors for relative rotation at a constant rate, and means for compensating for the irregular rate of travel of the area of contact of each piston with its associated cylinder throughout the period of their engagement.

5. In a rotary motor, a pair of substantially tangentially arranged rotors journalled for rotation in opposite directions, a plurality of cylinders carried by one of said rotors, a plurality of pistons carried by the other rotor, each piston being receivable in one of said cylinders as the rotors turn, a piston rod interposed between each piston and the associated rotor, said rods being pivoted to the rotor, and means for rocking the piston rods to compensate for the irregular rate of travel of the area of contact of each piston with its associated cylinder throughout the period of their engagement.

6. In a rotary motor, a pair of substantially tangentially arranged rotors journalled for rotation in opposite directions, a plurality of cylinders carried by one of said rotors, a plurality of pistons carried by the other rotor, each piston being receivable in one of said cylinders as the rotors turn, a piston rod interposed between each piston and the associated rotor, said rods being pivoted to the rotor, an arm rigid with each rod, and a stationary cam in position to be engaged by said arms during turning of said piston rotor to rock the piston rods to compensate for the irregular rate of travel of the area of contact of each piston with its associated cylinder throughout the period of their engagement.

7. In a rotary motor, a pair of substantially tangentially arranged rotors journalled for rotation in opposite directions, a plurality of cylinders carried by one of said rotors, a plurality of pistons carried by the other rotor, each piston being receivable in one of said cylinders as the rotors turn, a piston rod interposed between each piston and the associated rotor, said rods being pivoted to the rotor, an arm rigid with and extending laterally from each of said rods, a roller journalled upon each of said arms, a stationary continuous cam in position to be engaged by said rollers, resilient means urging said rollers against the cam, and irregularities in said cam adapted to rock the pistons when engaged by the rollers to compensate for the irregular rate of travel of the area of contact of each piston with its associated cylinder throughout the period of their engagement.

8. In a rotary motor, a rotor journalled for rotation, said rotor comprising a hollow spoke and an annular chamber forming a common intake manifold, a plurality of cylinders disposed about said rim, each cylinder having an intake port communicating with said manifold, a valve seating in each of said ports, a valve stem carried by each valve and extending radially inwards from the associated cylinder, and a stationary cam engageable by said valve stems as the rotor turns to unseat the valves and open said ports.

9. In a rotary motor, a rotor journalled for rotation, said motor comprising a hollow spoke and an annular chamber forming a common intake manifold, a plurality of cylinders disposed about said rim, each cylinder having an intake port communicating with said manifold, a valve seating in each of said ports, a valve stem carried by each valve and extending outside its cylinder, and a stationary cam engageable by said valve stems as the rotor turns to unseat the valves and open said ports.

10. In a rotary motor, a pair of rotors journalled for rotation, one of said rotors comprising a hollow rim and a hollow spoke forming an intake manifold, means supplying said manifold with fuel, a plurality of cylinders disposed about said rim and extending radially therefrom, said cylinders being open at their outer ends and each having an intake port communicating with said manifold, a valve seating in each of said ports, resilient means normally retaining said valves seated to close the ports, a valve stem on each valve extending radially inwards to a point inside the rim, a stationary cam engageable by said valve stems as the rotor turns to unseat valves, a plurality of pistons carried by the other rotor, each piston being receivable within one of said cylinders as the rotors turn, and means for igniting the fuel in each cylinder when said cylinder and its associated piston are substantially between the axes of rotation of said rotors.

11. In a rotary motor, a pair of rotors journalled for rotation, one of said rotors comprising a hollow rim and a hollow spoke forming an intake manifold, means supplying said manifold with fuel, a plurality of cylinders disposed about said rim and extending radially therefrom, said cylinders being open at their outer ends and each having an intake port communicating with said manifold, a valve seating in each of said ports, resilient means normally retaining said valves seated to close the ports, a valve stem on each valve extending radially inwards to a point inside the rim, a stationary cam engageable by said valve stems as the rotor turns to unseat valves, a plurality of pistons carried by the other rotor, each piston being receivable within one of said cylinders as the rotors turn, a conductor associated with each plug and terminating at one side of the associated rotor, a stationary contact disposed substantially in the plane including the axes of rotation of both of said rotors and in position to be engaged by said plug conductors as they move therepast, and means for energizing said stationary contact.

In testimony whereof I have signed my name to this specification.

HENRY H. HAMMERSTROM.